Jan. 28, 1964     M. A. MAYHEW     3,119,920
MOVING HEATER STRIP TEMPERATURE CONTROL
Filed May 29, 1962
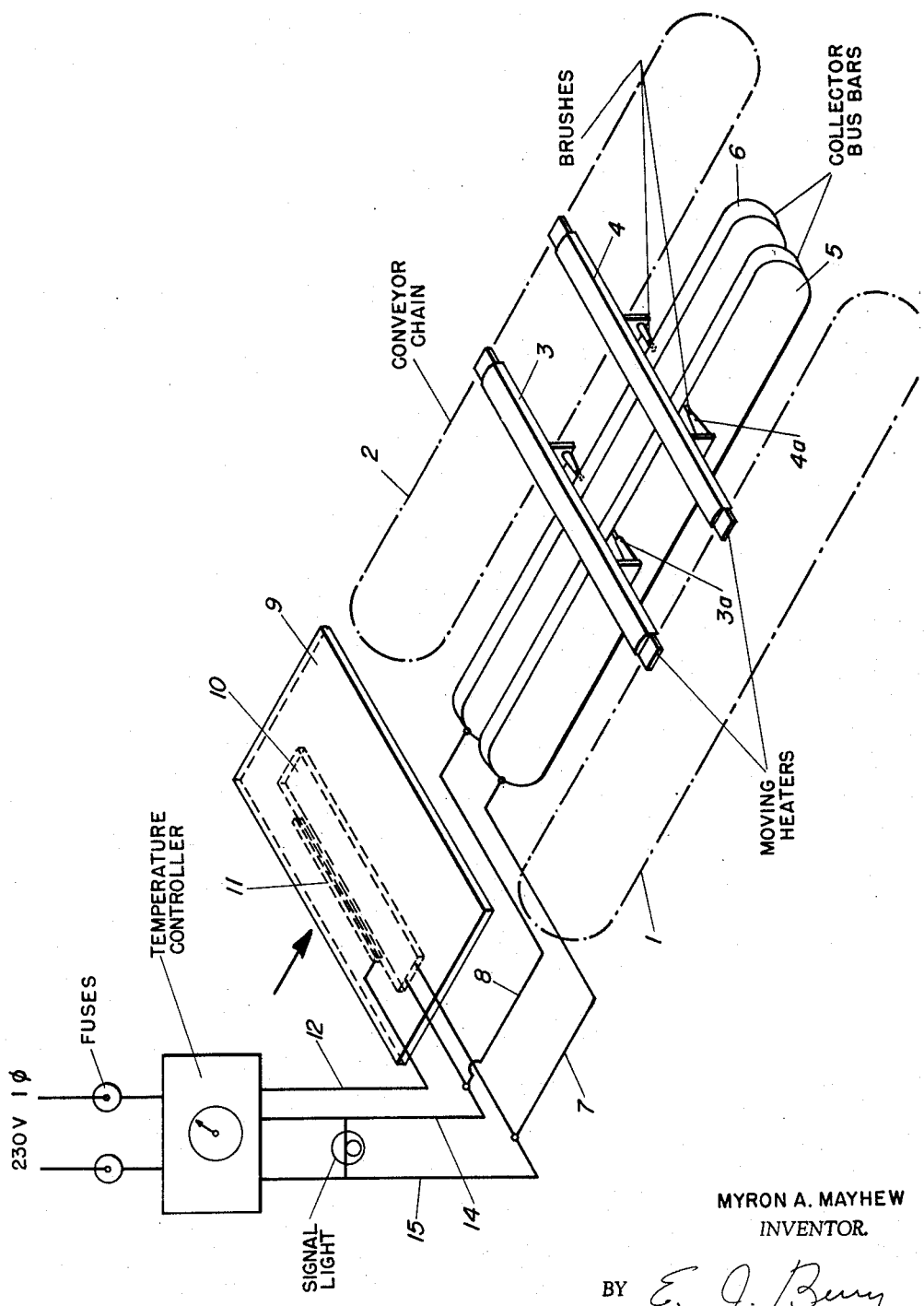
MYRON A. MAYHEW
INVENTOR.
BY E. J. Berry

United States Patent Office 3,119,920
Patented Jan. 28, 1964

3,119,920
MOVING HEATER STRIP TEMPERATURE CONTROL
Myron A. Mayhew, Rochester, N.Y., assignor to National Distillers and Chemical Corporation, New York, N.Y., a corporation of Virginia
Filed May 29, 1962, Ser. No. 198,632
2 Claims. (Cl. 219—19)

The present invention relates to a means for controlling the temperature of strip heaters which are supported for conveyance through an elongated travel path. The invention further relates to a means separate from said strip heaters for sensing temperatures equivalent to those developed by said strip heaters and for simultaneously regulating and controlling the sensed temperature and the actual temperature of the strip heaters.

Heated conveyor systems, wherein the conveyor platform is formed of a series of strip heater elements supported at their ends between a pair of parallel chains or link belt conveyor elements, are employed in many forms of industrial machines. Such a system is of particular usefulness in the field of bread wrapping machinery, wherein the loaves are enclosed in a wrapping such as cellophane or waxed paper with the free edges of the wrapper sheet being tucked and folded at the ends, forming end closures; overlapped along the bottom of the loaves; and sealed by fusion of the wrapper material or of a coating thereon (waxed paper).

In recent times, it has been found that materials such as extruded polyethylene films afford characteristics of greater strength, superior transparency, and more flexibility than the conventional materials. The use of such improved materials has been impeded, however, by the fact that such films are extremely sensitive to heat, and existing bread wrapping machinery does not afford adequate means for controlling the temperature of the strip heaters forming the wrapped bread conveyor platform and which provide the means for sealing the overlapped seam along the bottom of the wrapper.

In a conventional wrapping machine, the strip heater elements are heated by contained electrical resistance unit energized by brush contact with electrical conductors or bus bars disposed between the conveyor means and within the circumference of the total travel path of the heater strips. The bus bars are energized from a source of energy through a rheostat or variable transformer. In such an apparatus, a constant voltage is delivered to the heater strip resistance units, regardless of the requirement for more or less energy to maintain any predetermined temperature value in the strips. Such a system cannot afford control which is sensitive to any requirement of the wrapping material used or to changes in external environmental conditions including air temperature or air currents.

The deficiencies of the conventional machines are not of great concern where employing conventional wrapping materials. When employing materials of greater temperature sensitivity, however, more exact control of strip heater temperature becomes critical. To avoid burning, melting, or puckering of the sealed surfaces, it is desirable that seal temperatures in the strip heater elements be maintained within 5° + or − the predetermined seal temperature.

It is one object of the present invention to provide a means for regulating and controlling the temperature of an electrically heated conveyor platform composed of a continuous series of platform elements, wherein said elements are moved along a planar travel path from an initial point in said path. It is also an object to provide such a control means and system wherein temperature control of a moveable, heated platform is effected through a fixed and separate heated platform element disposed in substantially the environment of said moveable platform.

The invention and its objects may be understood more readily from the following description, when it is read in conjunction with the accompanying drawing. In this drawing, the invention and the conventional apparatus to which it is related are illustrated in a combined, schematic, and diagrammatic form.

Referring to the drawing, the numerals 1 and 2 designate the representation of paired, parallel spaced conveyor chains or link belt members. The numerals 3 and 4 designate 2 elements of a series of elongated strip heater elements adapted to be supported on and secured to the conveyor elements at their ends and bridging the space between such elements.

The strip heater elements are disposed in closely spaced, parallel, edgewise relation. In a typical installation, selected elements only may be heated, the heated elements being selected at intervals corresponding to the spacing from center to center of the seals to be formed by contact with the heated strips. The heater strips 3 and 4 are of conventional form, including encased resistance heater units energized as by brush connections, designated by the numerals 3a and 4a, adapted to contact a pair of bus bars 5 and 6. Suitable means, not shown, are provided for driving the conveyor means 1 and 2. The direction of travel of the means 1 and 2, in the arrangement illustrated, is designated by arrows in the drawing, and the initial point of the travel path of the conveyor platform is thus established at the left hand side of the drawing.

Normally, the bus bars 5 and 6 would be connected to a source of electrical energy through a variable transformer or rheostat. According to the present invention, however, the bus bars 5 and 6 are connected to a source of electrical energy designated by the lines 7 and 8, by a circuit which includes a control switch adapted to make or break the circuit in response to a predetermined temperature setting.

Immediately ahead of the initial point in the conveyor system, a stationary entrance plate 9 is disposed in a plane common to that of the conveyor strip heater elements. In use, this plate is covered with a non-adhesive material, such as Teflon. The plate is heated by means such as a resistance heater unit, shown by dashed lines in the drawing and designated by the numeral 10. If desired, however, the plate may be formed with an integral heater unit. The heater unit 10 is connected in the electrical circuit in parallel with the bus bars 5 and 6, through lines 14 and 15, and is controlled by the same switch.

The switch in turn is actuated by thermostatic or heat sensitive means, indicated in the drawing by dashed lines and designated by the numeral 11, with connection 12 shown between the heat resistive means and the switch control device. The heat sensitive means and the control switch, as well as the means whereby the control switch is adjusted to a predetermined temperature value are all of conventional form and assembly. The control switch contemplated is a Wilcolator G-4 or its commercial equivalent.

In operation, the conveyor and the platform provided by the strip heaters 3 and 4 are set in motion at any desired operating speed. Next, the switch control is set to establish any predetermined temperature in the respective strip heaters 3 and 4 and the stationary entrance plate 9. When the control switch has assumed an on-off condition at least twice, the system is prepared to function in the manner intended. At that point, the stationary plate and the strip heaters will be at substantially the same desired temperature, and in operation changes of temperature in the plate will be representative of the changes which take place in the strip heaters. The stationary plate temperature as transmitted to the switch will thereby effectively maintain that of the strip heaters at a substantially constant, predetermined value.

What is claimed is:

1. In combination with an electrically heated strip conveyor, wherein said conveyor includes a series of heater strips disposed in substantially parallel edgewise relation, means for conveying said strips through a continuous travel path having initial and final points in said path and in one plane, and electrical means for heating said strips; a means for regulating and controlling the temperature of said strips, comprising a fixed plate, having an upper surface, disposed substantially in the operating environment of said heater strips in close proximity to the initial point in the travel path of said heater strips and laterally of said path, with said fixed plate upper surface substantially in the plane of said path; electrical means for heating said plate; an electrical circuit adapted to connect the respective heating means for said strips and plate, in parallel, to a source of electrical energy, said circuit including an on and off control switch intermediate said power source and said heating means associated with said plate; and electrical means to actuate said switch including means for sensing the temperature of said plate and said plate heating means with reference to a predetermined temperature value for said heater strips.

2. An apparatus according to claim 1, wherein said means to actuate said switch is a thermostatically controlled electrical relay.

References Cited in the file of this patent

UNITED STATES PATENTS

| 1,401,303 | Baldwin | Dec. 27, 1921 |
| 2,649,530 | Dietz | Aug. 18, 1953 |
| 2,932,718 | Marsters | Apr. 12, 1960 |
| 2,991,346 | Bahus | July 4, 1961 |

FOREIGN PATENTS

| 513,399 | Germany | Nov. 27, 1930 |